United States Patent
Cieslak et al.

(10) Patent No.: US 11,811,846 B2
(45) Date of Patent: *Nov. 7, 2023

(54) THERMAL STATE INFERENCE BASED FREQUENCY SCALING

(71) Applicant: Snap Inc., Santa Monica, CA (US)

(72) Inventors: Michael Cieslak, Los Angeles, CA (US); Michael David Marr, Monroe, WA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/747,843

(22) Filed: May 18, 2022

(65) Prior Publication Data

US 2022/0279031 A1    Sep. 1, 2022

Related U.S. Application Data

(63) Continuation of application No. 17/347,298, filed on Jun. 14, 2021, now Pat. No. 11,368,558, which is a continuation of application No. 16/382,409, filed on Apr. 12, 2019, now Pat. No. 11,140,243.

(60) Provisional application No. 62/827,012, filed on Mar. 30, 2019.

(51) Int. Cl.
  *H04L 67/01*  (2022.01)
  *G06F 9/355*  (2018.01)

(52) U.S. Cl.
  CPC ............ *H04L 67/01* (2022.05); *G06F 9/3555* (2013.01)

(58) Field of Classification Search
  CPC .............................. H04L 67/42; G06F 9/3555
  See application file for complete search history.

(56) References Cited

U.S. PATENT DOCUMENTS

| | | | |
|---|---|---|---|
| 6,442,700 B1 * | 8/2002 | Cooper | G06F 1/206 713/323 |
| 9,146,814 B1 * | 9/2015 | van der Merwe | G06F 11/3058 |
| 9,557,792 B1 * | 1/2017 | Potlapally | G06F 1/3206 |
| 10,412,022 B1 * | 9/2019 | Tang | H04L 47/781 |
| 10,697,661 B2 | 6/2020 | Chen et al. | |
| 11,140,243 B1 | 10/2021 | Cieslak et al. | |
| 11,368,558 B1 | 6/2022 | Cieslak et al. | |
| 11,442,513 B1 | 9/2022 | Cieslak et al. | |
| 2006/0090161 A1 * | 4/2006 | Bodas | G06F 9/5044 718/100 |
| 2010/0073068 A1 * | 3/2010 | Cho | H03K 19/00369 327/513 |
| 2011/0320061 A1 * | 12/2011 | Chen | G05D 16/185 700/300 |

(Continued)

FOREIGN PATENT DOCUMENTS

WO    2013101116 A1    7/2013

*Primary Examiner* — Mohamed A. Wasel
*Assistant Examiner* — James Ross Hollister
(74) *Attorney, Agent, or Firm* — Culhane Meadows PLLC; Stephen J. Weed

(57) ABSTRACT

The systems and methods monitor thermal states associated with a device. The systems and methods set thermal thresholds associated with the device. The systems and methods infer the thermal thresholds from information gathered by a client application running on the device. The systems and methods implement a stored policy associated with a violation of one of the thermal thresholds by one of the monitored thermal states.

18 Claims, 6 Drawing Sheets

(56) References Cited

U.S. PATENT DOCUMENTS

| | | | | |
|---|---|---|---|---|
| 2012/0110352 A1* | 5/2012 | Branover | ................ | G06F 1/206 |
| | | | | 713/300 |
| 2012/0272086 A1* | 10/2012 | Anderson | ................ | G06F 1/206 |
| | | | | 713/340 |
| 2013/0013126 A1* | 1/2013 | Sals | ........................ | G06F 1/206 |
| | | | | 700/299 |
| 2013/0132972 A1* | 5/2013 | Sur | .................... | G06F 11/3058 |
| | | | | 718/105 |
| 2013/0138419 A1* | 5/2013 | Lopez | ................ | G06F 11/3058 |
| | | | | 703/21 |
| 2013/0159741 A1* | 6/2013 | Schluessler | ........... | G06F 1/3253 |
| | | | | 713/320 |
| 2013/0305257 A1 | 11/2013 | Otomo et al. | | |
| 2014/0006818 A1* | 1/2014 | Doshi | .................... | G06F 1/206 |
| | | | | 713/320 |
| 2014/0013098 A1 | 1/2014 | Yeung | | |
| 2014/0222242 A1* | 8/2014 | Poornachandran | ..... | G06F 1/206 |
| | | | | 700/300 |
| 2015/0074469 A1* | 3/2015 | Cher | .................... | G06F 11/008 |
| | | | | 714/47.2 |
| 2015/0169381 A1 | 6/2015 | Ramadoss | | |
| 2017/0302782 A1* | 10/2017 | Wang | ...................... | G06F 1/206 |
| 2017/0321921 A1* | 11/2017 | Chen | ...................... | H04M 19/04 |
| 2017/0339178 A1* | 11/2017 | Mahaffey | .............. | H04L 41/142 |
| 2017/0373955 A1 | 12/2017 | Kocoloski et al. | | |
| 2018/0157298 A1 | 6/2018 | Shah et al. | | |
| 2019/0089611 A1* | 3/2019 | Kondalam | .............. | H04L 43/10 |
| 2019/0155712 A1* | 5/2019 | Tiwari | ................ | G06N 3/0427 |
| 2020/0174542 A1 | 6/2020 | Rao et al. | | |

* cited by examiner

THERMAL STATE INFERENCE BASED FREQUENCY SCALING

CROSS-REFERENCE TO RELATED APPLICATIONS

This application is a continuation of U.S. application Ser. No. 17/347,298 filed on Jun. 14, 2021, which is a continuation of U.S. application Ser. No. 16/382,409 filed on Apr. 12, 2019, now U.S. Pat. No. 11,140,243, and claims priority to U.S. Provisional Application Ser. No. 62/827,012 filed on Mar. 30, 2019, the contents of all of which are incorporated fully herein by reference.

TECHNICAL FIELD

The present disclosure relates to thermal throttling of mobile devices, and more particularly, to adaptive thermal throttling with capability for configuration.

BACKGROUND

Devices with reduced form factors typically rely on passive cooling to avoid overheating. Thermal thresholds and limitations for devices are generally set by device manufacturers.

BRIEF DESCRIPTION OF THE DRAWINGS

To easily identify the discussion of any particular element or act, the most significant digit or digits in a reference number refer to the figure number in which that element is first introduced.

In the drawings, which are not necessarily drawn to scale, like numerals may describe similar components in different views. Like numerals having different letter suffixes may represent different instances of similar components. Some examples are illustrated by way of example, and not limitation, in the figures of the accompanying drawings in which.

DETAILED DESCRIPTION

The description that follows includes systems, methods, techniques, instruction sequences, and computing machine program products illustrative of examples of the disclosure. In the following description, for the purposes of explanation, numerous specific details are set forth in order to provide an understanding of various examples described herein. It will be evident, however, to those skilled in the art, that examples of the described subject matter may be practiced without these specific details. In general, well-known instruction instances, protocols, structures, and techniques are not necessarily shown in detail.

One aspect of the present disclosure describes a system for detecting thermal throttling of a device running an application and configuring the application to minimize resource use to minimize heat generation by returning the device to an unthrottled state, while maintaining positive user experience.

Figure 1:
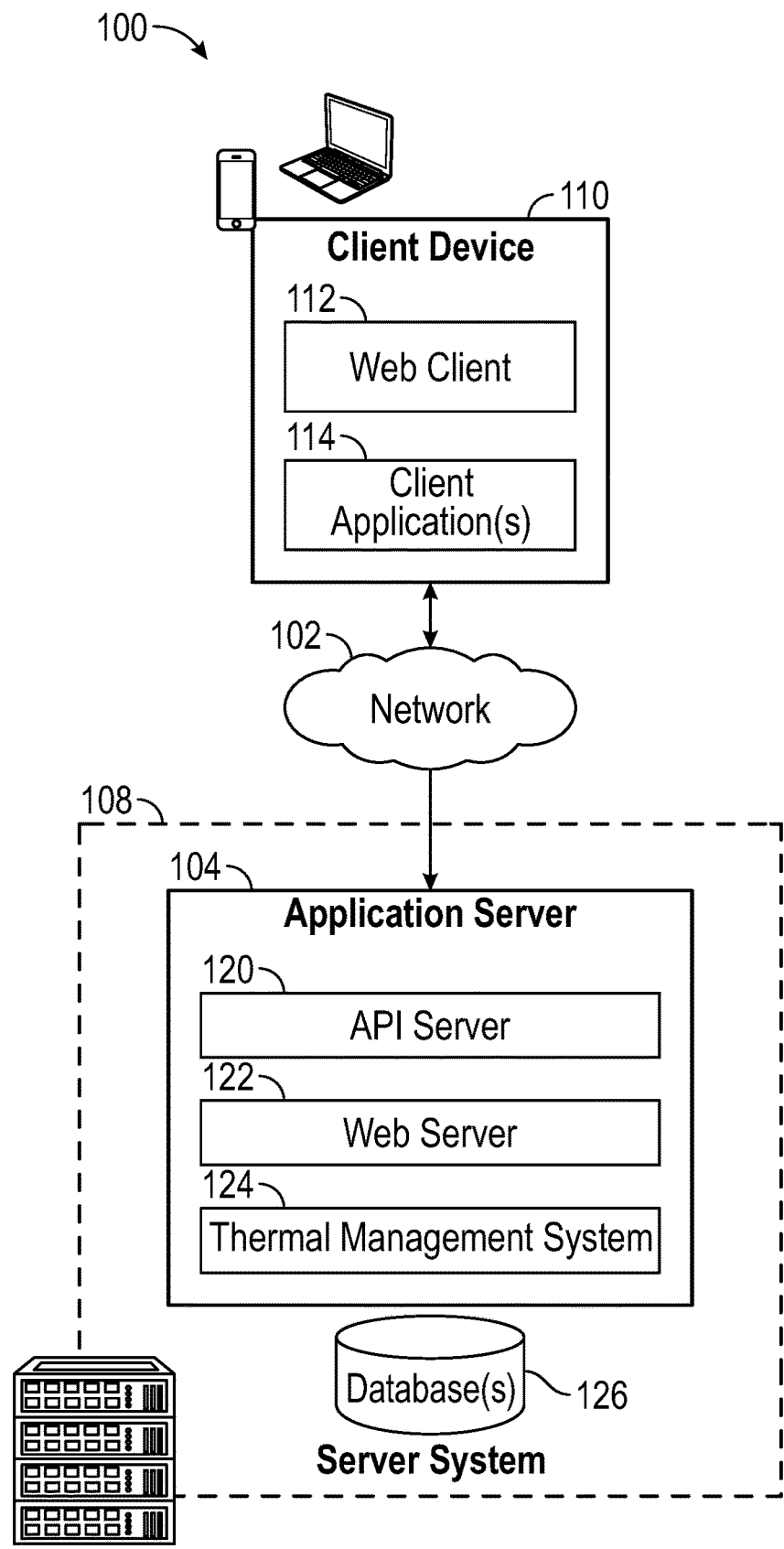
FIG. 1 is a block diagram showing an example thermal state inference-based frequency scaling system.

FIG. 1 is a block diagram illustrating a system 100, according to some examples, configured to detect thermal throttling. The system 100 includes one or more client devices such as client device 110. The client device 110 comprises, but is not limited to, a mobile phone, desktop computer, laptop, portable digital assistants (PDA), smart phone, tablet, ultrabook, netbook, laptop, multi-processor system, microprocessor-based or programmable consumer electronic, game console, set-top box, computer in a vehicle, or any other communication device that a user may utilize to access the system 100. In some examples, the client device 110 comprises a display module (not shown) to display information (e.g., in the form of user interfaces). In further examples, the client device 110 comprises one or more of touch screens, accelerometers, gyroscopes, cameras, microphones, global positioning system (GPS) devices, and so forth. The client device 110 may be a device of a user that is used to access and utilize an online social platform. One or more users may be a person, a machine, or other means of interacting with the client device 110. In examples, the user may not be part of the system 100 but may interact with the system 100 via the client device 110 or other means. For instance, the user may provide input (e.g., touch screen input or alphanumeric input) to the client device 110 and the input may be communicated to other entities in the system 100 (e.g., server system 108, etc.) via the network 102. In this instance, the other entities in the system 100, in response to receiving the input from the user, may communicate information to the client device 110 via the network 102 to be presented to the user.

One or more portions of network 102 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WiFi network, another type of network, or a combination of two or more such networks.

The client device 110 may access various data and applications provided by other entities in the system 100 via web client 112 (e.g., a browser) or one or more client applications 114. The client device 110 may include one or more client application(s) 114 (also referred to as "apps") such as, but not limited to, a web browser, messaging application, electronic mail (email) application, an e-commerce site application, a mapping or location application, an online home buying and selling application, a real estate application, and the like. In some examples, one or more client application(s) 114 are included in a given one of the client device 110, and configured to locally provide a user interface and at least some of the functionalities, with the client application(s) 114 configured to communicate with other entities in the system 100 (e.g., server system 108, etc.), on an as-needed basis, for data processing capabilities not locally available (e.g., to access location information, to authenticate a user, etc.).

Figure 2:
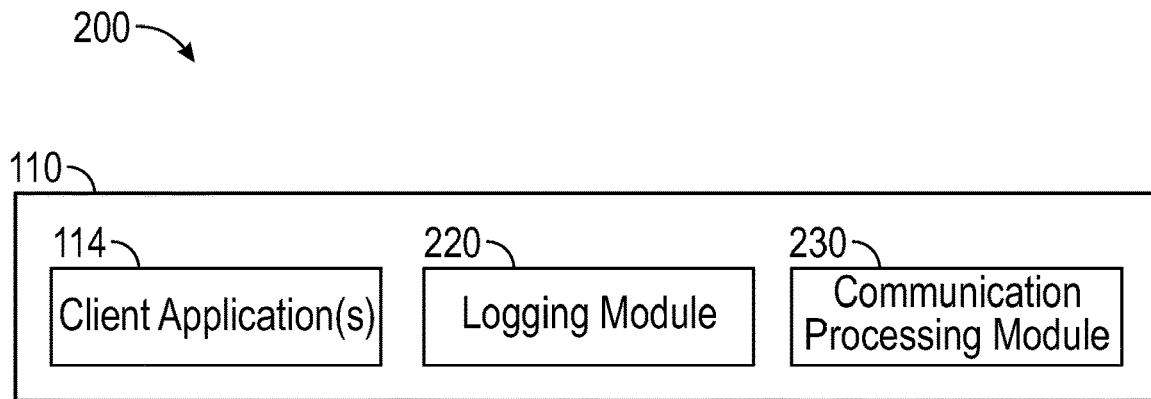
FIG. 2 is a block diagram 200 of an example consistent with the present disclosure.

FIG. 2 illustrates a system block diagram 200 of an example further illustrating device 110 showing, in addition to client application(s) 114, logging module 220 and communication processing module 230. In some examples logging module 220 may be used to logs events autonomously or associated with user or remote configuration activity. Communication processing module 230 may be used to provide communication from the device 110 to a remote server such as server system 108.

Figure 3:
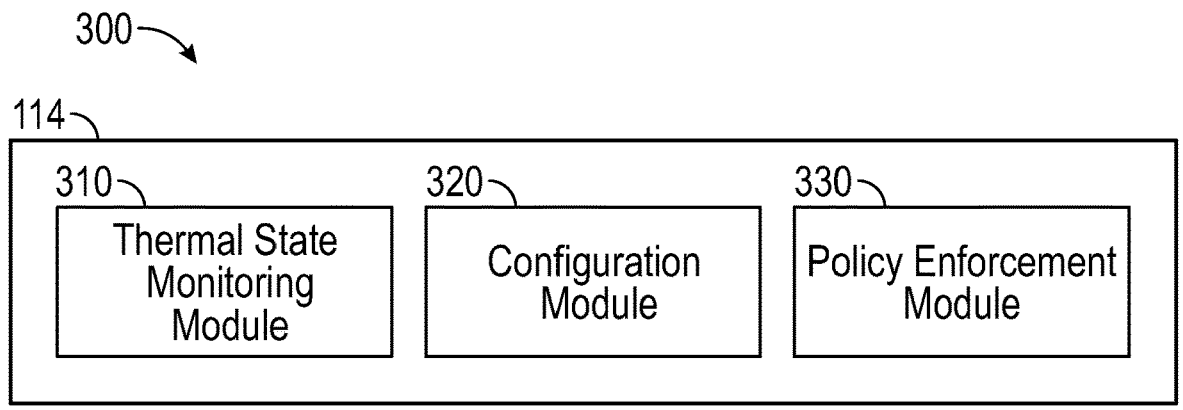
FIG. 3 illustrates a system block diagram 300 of an example consistent with the present disclosure.

FIG. 3 is a block diagram 300 of an example client application(s) 114 consistent with the present disclosure. Client application 114 comprises thermal state monitoring module (TSMM) 310, configuration module 320, and policy enforcement module 330. Thermal state monitoring module 310 monitors CPU (central processing unit) frequency and load to infer the thermal state of device 110 by monitoring events logged via logging module 220. Monitoring may be continuous, or according to a predetermined period (i.e., scheduled in advance), or initiated in response to a user-initiated interaction with the device 110. In some examples thermal state monitoring module 310 combines core frequency and load information to create an operation index for the core during one or more sampling periods. For multi-thread applications or where multiple single-thread applications are being run concurrently, operation indexes for each core can be summed to create a master operation index. To infer the thermal state of the device 110, the thermal state monitoring module 310 evaluates the logged CPU frequency and load to determine the maximum frequency that a CPU (i.e., core) can run at to assess the CPU's maximum operating frequency. At a later time, if the load factor is maximum, thereby indicating a 100% utilization rate, but the CPU frequency is lower than the maximum frequency previously logged, it is inferred that device 110 is in a thermally throttled thermal state. Thermal state monitoring module 310 may be configured to monitor thermal states associated with the sub-systems of FIG. 2. Configuration module 320 may provide the capability to set thermal thresholds to be associated with device 110. These thresholds may be based on monitoring module 310. Policy enforcement module 330 may implement a stored thermal management policy that has been associated with a violation of one of the thermal thresholds by one of the monitored thermal states. Thermal management policies may include taking actions such as decreasing (or otherwise adjusting) a clock frequency of a processor or other hardware component. The policies may be customized to depend on the current operational mode of the device 110 such as, for example, web browsing, GPS location servicing, or placing a phone call.

Figure 4:
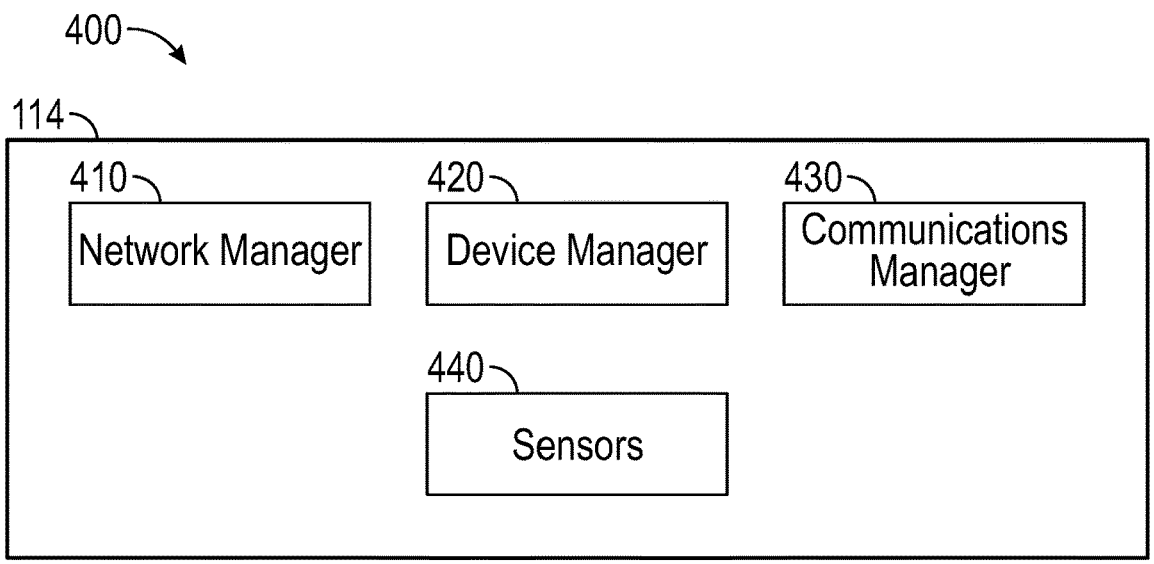
FIG. 4 is a block diagram 400 illustrating an example consistent with the present disclosure.

FIG. 4 is a block diagram 400 of an example client application(s) 114 consistent with the present disclosure. Client application 114 may include multiple components such as a network manager 410, a device manager 420, a communications manager 430, and various sensors 440, such as an accelerometer, temperature sensor, etc. When device 110 is in an unthrottled state as inferred by CPU load and frequency at maximum operating index, client application 114 may perform speculative work in anticipation of a user's next action. Speculative work includes, for example, executing tasks associated with various filters that may be needed, e.g., request climate information such a current temperature and format prior to reaching a filter that includes this information, or the application may preload information for future tasks based on prior actions by a user. However, when thermal state monitoring module 310 detects that device 110 is in a throttled state, client application 114 may reduce the speculative work that application 114 typical performs when the device is in its unthrottled state to allow the device to dissipate heat and improve the user's experience. The speculative work may be reduced via adjusting the activity of the network manager. Moreover, even non-speculative and/or non-critical work (e.g., data backup) may also be reduced via adjusting the activity of various components of client application 114, including the activity of the network manager 410. The policies may also be customized to depend on the identity of a current user of the device 110 or to depend on the particular device 110.

Figure 9:
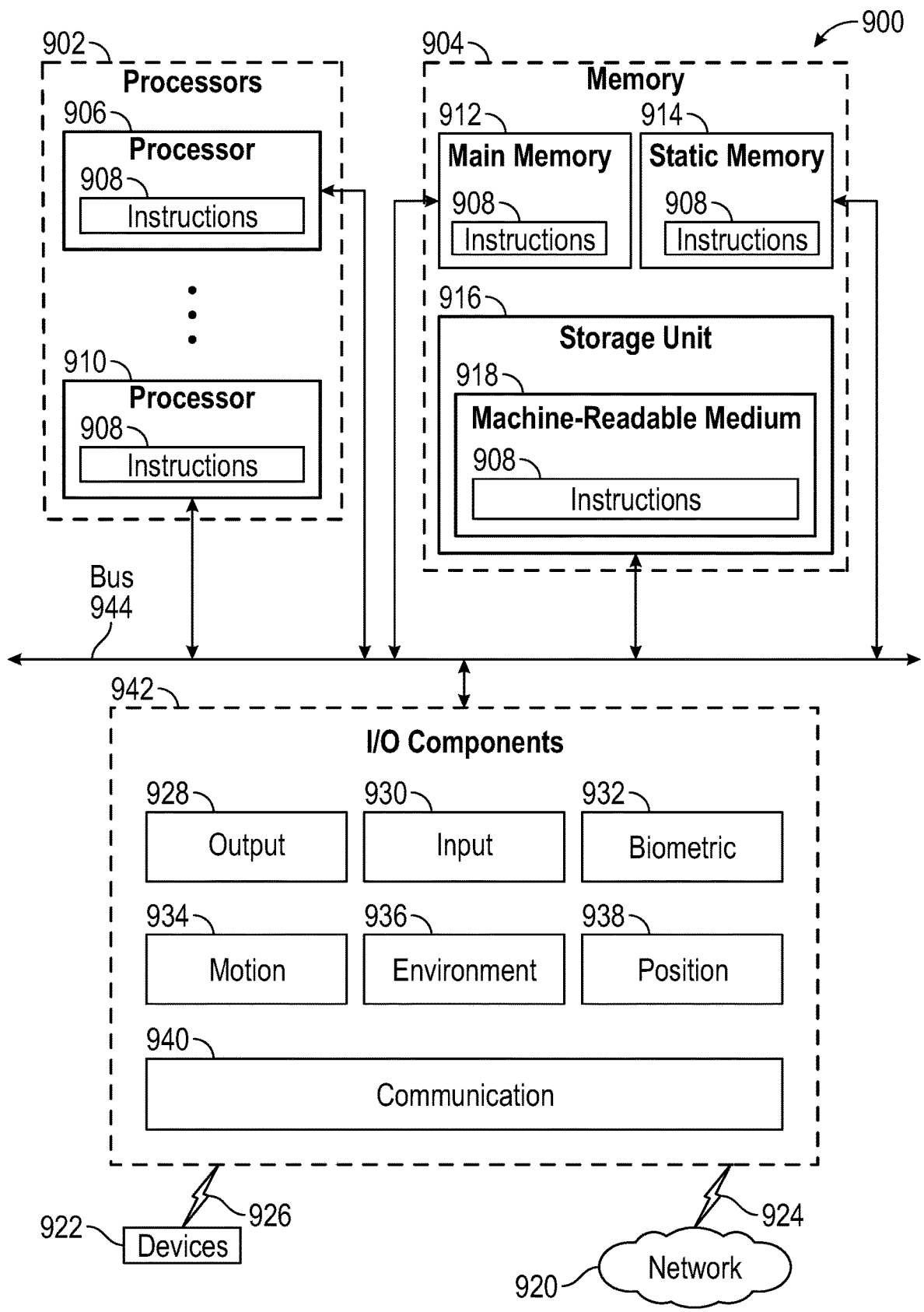
FIG. 9 is a diagrammatic representation of a machine in the form of a computer system within which a set of instructions may be executed for causing the machine to perform any one or more of the methodologies discussed herein, in accordance with some examples.

Although the following flowcharts may describe the operations as a sequential process, many of the operations can be performed in parallel or concurrently. In addition, the order of the operations may be re-arranged. A process is terminated when its operations are completed. A process may correspond to a method, a procedure, etc. The steps of method may be performed in whole or in part, may be performed in conjunction with some or all of the steps in other methods, and may be performed by any number of different systems, such as the systems described in: FIG. 1, and FIG. 9.

Figure 5:
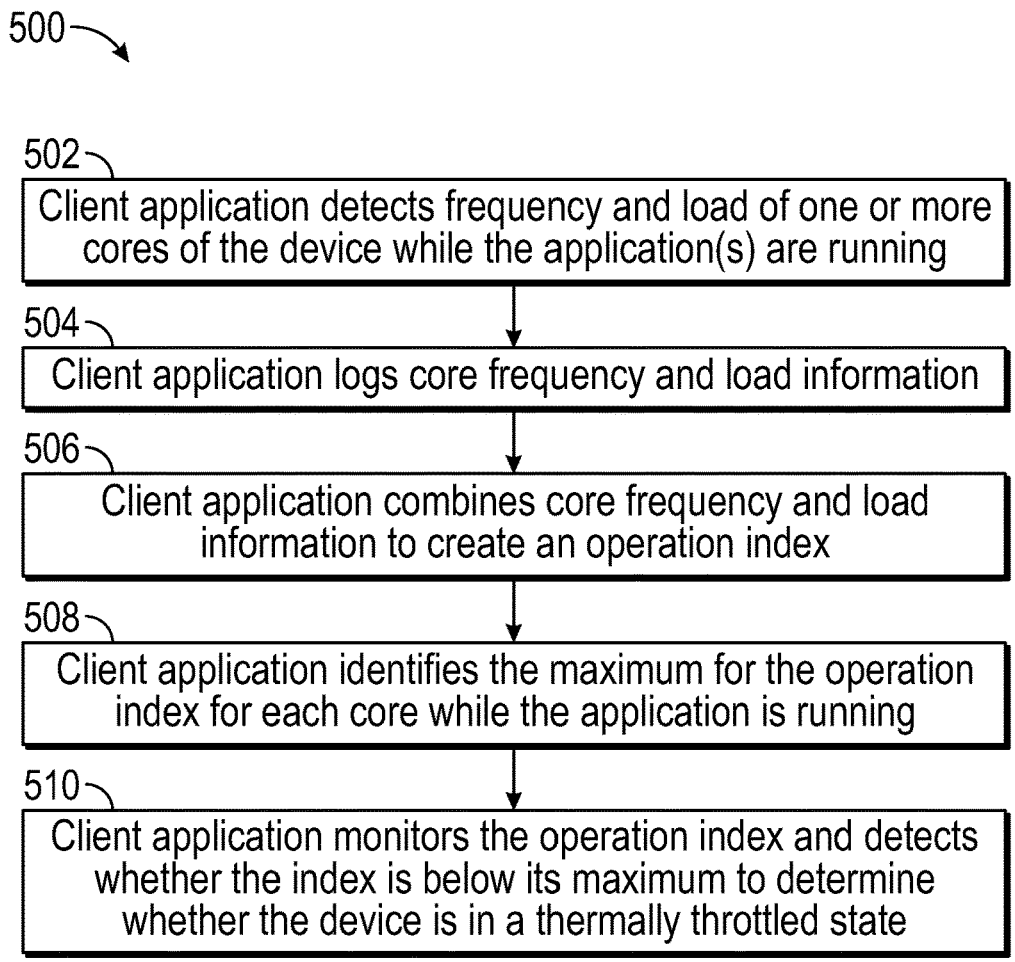
FIG. 5 is a flow diagram illustrating an example method consistent with the present disclosure.

FIG. 5 is a flow diagram illustrating an example method for monitoring and determining thermal management according to an example. In FIG. 5, the method 500 starts with the thermal monitoring module 310 of the client application 114 detecting frequency and load of one or more CPUs/cores of device 110 while the application(s) is running at operation 502. At operation 504, the logging module 220 logs core frequency and load information.

At operation 506, the client application 114 combines core frequency and load information to create an operation index for the core during one or more sampling periods that may or may not be predetermined, such as according to a scheduled period or a period otherwise determined in advance. The average CPU load and frequency may be combined to provide the operation index. For multi-thread applications or where multiple single-thread applications are being run concurrently, operation indexes for each core can be summed to create a master operation index.

At operation 508, client application 114 identifies the maximum for the operation index for each core while the application is running and/or a master operation index for all cores running either while the application is running.

At operation 510, client application 114 monitors the operation index and/or the master operation index and detect whether the operation index (or master operation index) is below its maximum to determine whether device 110 is in a thermally throttled state.

Figure 6:
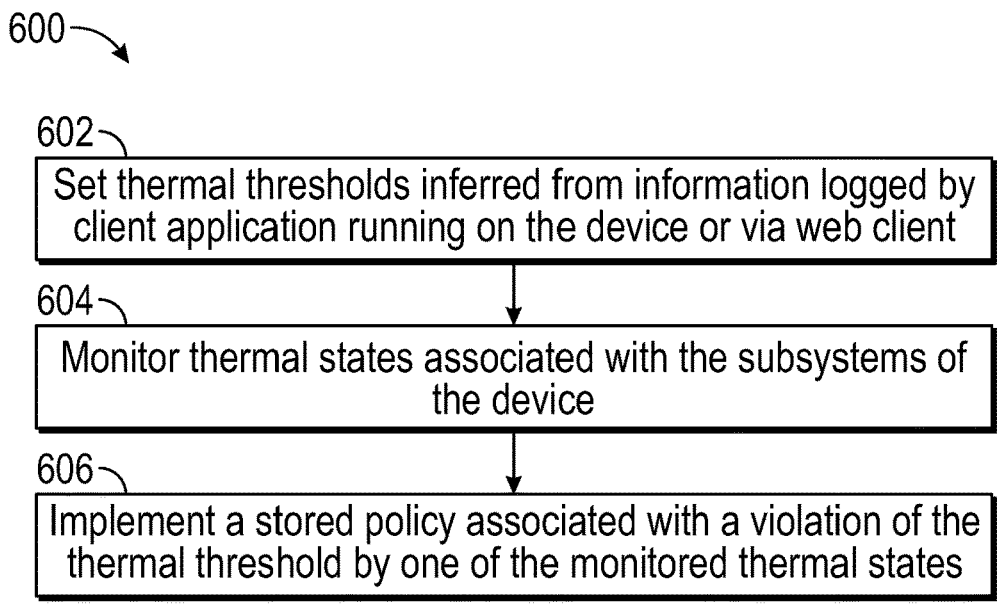
FIG. 6 is a flow diagram illustrating an example method consistent with the present disclosure.

FIG. 6 is a flow diagram illustrating a flowchart of operations 600 of another example consistent with the present disclosure. At operation 602, thermal thresholds are set based on information logged by client application 114 running on device 110 or via web client 112, such as calculated by the method of FIG. 5. At operation 604, thermal states associated with device 110 are monitored. At operation 606, a stored policy associated with a violation of the thermal threshold by one of the monitored thermal states is implemented. In some examples the stored policies are stored locally on the device. In some examples the stored policies are stored remotely such as server system 108 and the selection of a particular policy for implementation may depend on the current user and the current mode of operation of the device.

In some examples, the policies may be stored locally or remotely such as, for example, in a cloud server where they may be downloaded or accessed from one or more user devices.

Server system 108 provides server-side functionality via the network 102 (e.g., the Internet or wide area network (WAN)) to one or more client devices 110. The server system 108 comprises an application server 104 that includes an application program interface (API) server 120, a web server 122, and a server thermal management system 124, that may be communicatively coupled with one or more database(s) 126. The one or more database(s) 126 may be storage devices that store data related to users of the server system 108, applications associated with the server system 108, cloud services, housing market data, and so forth. The one or more database(s) 126 may further store information related to client device 110, client application(s) 114, users, and so forth. In one example, the one or more database(s) 126 may be cloud-based storage. The server system 108 may be a cloud computing environment, according to some examples. The server system 108, and any servers associated with the server system 108, may be associated with a cloud-based application, in one example.

In some examples, application 114 communicates the thermal status through internet 102 to server system 108 which in turn may remotely implement thermal management policies and performance preferences based on information gathered by thermal state monitoring module 310.

In some examples one or more client application(s) 114 may not be included in the client device 110, and then the client device 110 may use its web browser to access the one or more applications hosted on other entities in the system 100 such as server system 108.

Referring back to FIG. 1, server system 108 includes server thermal management system 124. Thermal management system 124 may include one or more servers and may be associated with a cloud-based application.

Figure 7:
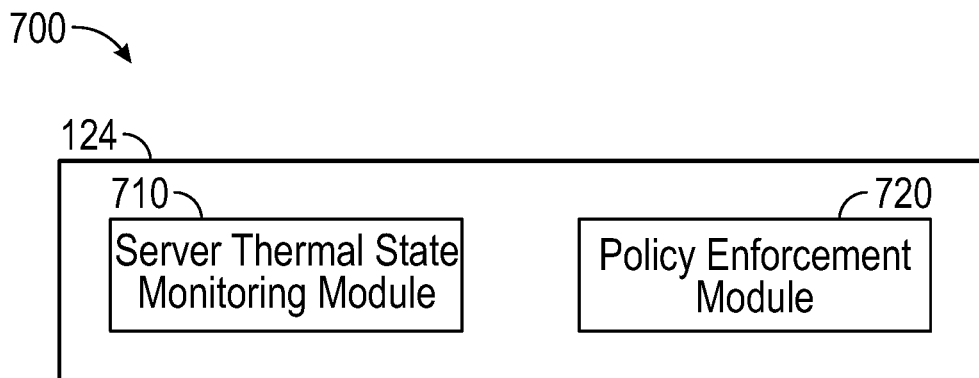
FIG. 7 is a block diagram 700 of an example consistent with the present disclosure.

FIG. 7 is a block diagram 700 of an example server such as server 108 comprising thermal management system 124 consistent with the present disclosure. Server thermal management system 124 comprises server thermal state monitoring module 710 and policy enforcement module 720. The thermal state monitoring module 710 of server 108 may receive CPU information (frequency and load) from thermal state monitoring module 310 via communication processing module 230 shown in FIG. 2 and in some examples further analyzes the device for potential thermal throttling when device 110 is running client application 114. In some examples server thermal state monitoring module 710 may upon identifying thermal throttling of device 110 invoke policy enforcement module 720 to implement a remotely stored policy residing in module 720 or modify a locally stored policy in application 114 on device 112.

Figure 8:
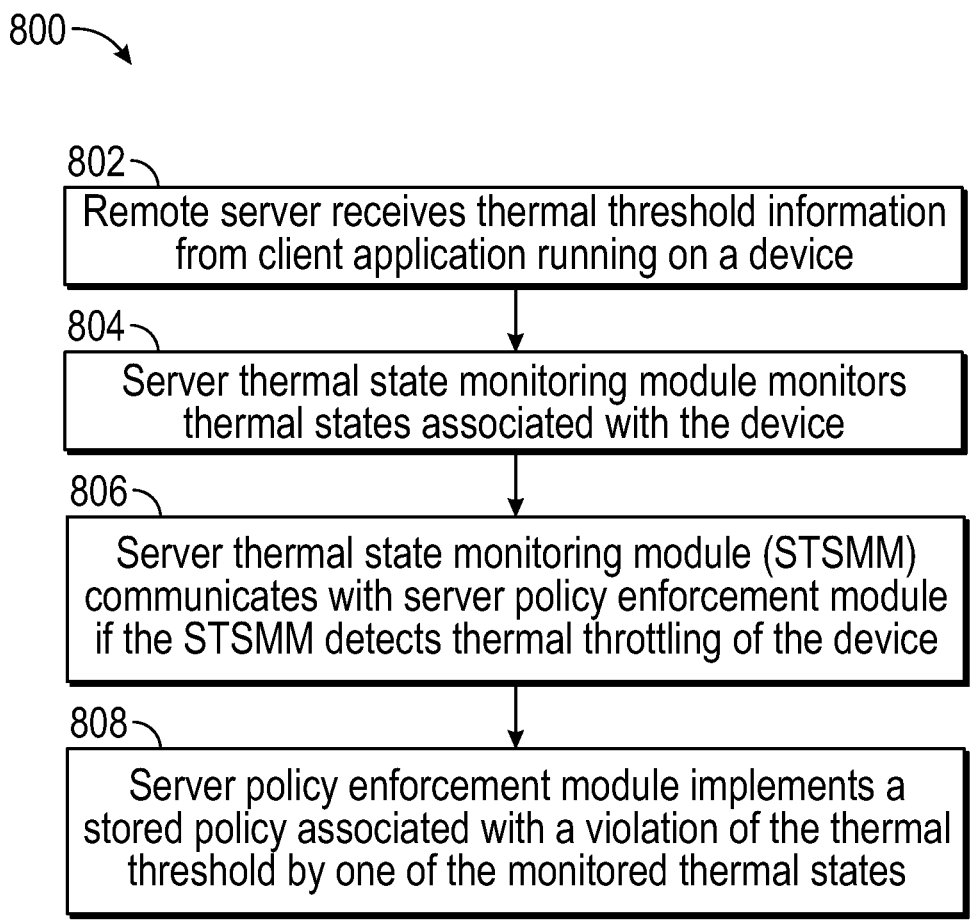
FIG. 8 is a flow diagram illustrating an example method consistent with the present disclosure.

FIG. 8 is a flow diagram illustrating a flowchart of operations 800 of an example method consistent with the present disclosure.

At operation 802, remote server 108 receives thermal threshold information from client application 114 running on device 110 received via communication processing module 230 of device 110 and network 102.

At operation 804, the server thermal state monitoring module (STSMM) 710 monitors thermal states associated with the device. In some examples the STSMM evaluates thermal state information received from application 114 and determines the throttle threshold of device 110 has been violated. In some examples, STSMM received a determination by thermal state monitoring module 310.

At operation 806, STSMM 710 communicates with server policy enforcement module if the STSMM detects thermal throttling of the device or receives a determination by thermal state monitoring module 310 of application 114 on device 110.

At operation 808, server policy enforcement module implements a stored policy associated with a violation of the thermal threshold by one of the monitored thermal states. In some examples the server policy enforcement module comprises two or more stored policies. In some examples, the selection of a particular policy for implementation may depend on the current user and the current mode of operation of the device. The stored policy (or the selected policy where there are at least two stored policies) is communicated to application 114 on device 110 to adjust or reduce speculative tasks running on application 114 in an effort put the device in a thermal state that does not violate the thermal threshold.

FIG. 9 is a diagrammatic representation of the machine 900 within which instructions 908 (e.g., software, a program, an application, an applet, an app, or other executable code) for causing the machine 900 to perform any one or more of the methodologies discussed herein may be executed. For example, the instructions 908 may cause the machine 900 to execute any one or more of the methods described herein. The instructions 908 transform the general, non-programmed machine 900 into a particular machine 900 programmed to carry out the described and illustrated functions in the manner described. The machine 900 may operate as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 908, sequentially or otherwise, that specify actions to be taken by the machine 900. Further, while only a single machine 900 is illustrated, the term "machine" shall also be taken to include a collection of machines that individually or jointly execute the instructions 908 to perform any one or more of the methodologies discussed herein.

The machine 900 may include processors 902, memory 904, and I/O components 942, which may be configured to communicate with each other via a bus 944. In an example, the processors 902 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 906 and a processor 910 that execute the instructions 908. The term "processor" is intended to include multi-core processors that may comprise two or more independent processors (sometimes referred to as "cores") that may execute instructions contemporaneously. Although FIG. 9 shows multiple processors 902, the machine 900 may include a single processor with a single core, a single processor with multiple cores (e.g., a multi-core processor), multiple processors with a single core, multiple processors with multiples cores, or any combination thereof.

The memory 904 includes a main memory 912, a static memory 914, and a storage unit 916, both accessible to the processors 902 via the bus 944. The main memory 904, the static memory 914, and storage unit 916 store the instructions 908 embodying any one or more of the methodologies or functions described herein. The instructions 908 may also reside, completely or partially, within the main memory 912, within the static memory 914, within machine-readable medium 918 (e.g., a non-transitory machine-readable storage medium) within the storage unit 916, within at least one of the processors 902 (e.g., within the processor's cache memory), or any suitable combination thereof, during execution thereof by the machine 900.

Furthermore, the machine-readable medium 918 is non-transitory (in other words, not having any transitory signals) in that it does not embody a propagating signal. However, labeling the machine-readable medium 918 "non-transitory" should not be construed to mean that the medium is incapable of movement; the medium should be considered as being transportable from one physical location to another. Additionally, since the machine-readable medium 918 is tangible, the medium may be a machine-readable device.

The I/O components 942 may include a wide variety of components to receive input, provide output, produce output, transmit information, exchange information, capture measurements, and so on. The specific I/O components 942 that are included in a particular machine will depend on the type of machine. For example, portable machines such as mobile phones may include a touch input device or other such input mechanisms, while a headless server machine will likely not include such a touch input device. It will be appreciated that the I/O components 942 may include many other components that are not shown in FIG. 9. In various examples, the I/O components 942 may include output components 928 and input components 930. The output components 928 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 930 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location, force of touches or touch gestures, or other tactile input components), audio input components (e.g., a microphone), and the like.

In further examples, the I/O components 942 may include biometric components 932, motion components 934, environmental components 936, or position components 938, among a wide array of other components. For example, the biometric components 932 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 934 include acceleration sensor components (e.g., accelerometer), gravitation sensor components, rotation sensor components (e.g., gyroscope), and so forth. The environmental components 936 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 938 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 942 further include communication components 940 operable to couple the machine 900 to a network 920 or devices 922 via a coupling 924 and a coupling 926, respectively. For example, the communication components 940 may include a network interface component or another suitable device to interface with the network 920. In further examples, the communication components 940 may include wired communication components, wireless communication components, cellular communication components, Near Field Communication (NFC) components, Bluetooth® components (e.g., Bluetooth® Low Energy), WiFi® components, and other communication components to provide communication via other modalities. The devices 922 may be another machine or any of a wide variety of peripheral devices (e.g., a peripheral device coupled via a USB).

Moreover, the communication components 940 may detect identifiers or include components operable to detect identifiers. For example, the communication components 940 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 940, such as location via Internet Protocol (IP) geolocation, location via Wi-Fi® signal triangulation, location via detecting an NFC beacon signal that may indicate a particular location, and so forth.

The various memories (e.g., memory 904, main memory 912, static memory 914, memory of the processors 902), storage unit 916 may store one or more sets of instructions and data structures (e.g., software) embodying or used by any one or more of the methodologies or functions described herein. These instructions (e.g., the instructions 908), when executed by processors 902, cause various operations to implement the disclosed examples.

The instructions 908 may be transmitted or received over the network 920, using a transmission medium, via a network interface device (e.g., a network interface component included in the communication components 940) and using any one of a number of well-known transfer protocols (e.g., hypertext transfer protocol (HTTP)). Similarly, the instructions 908 may be transmitted or received using a transmission medium via the coupling 926 (e.g., a peer-to-peer coupling) to the devices 922.

Figure 10:
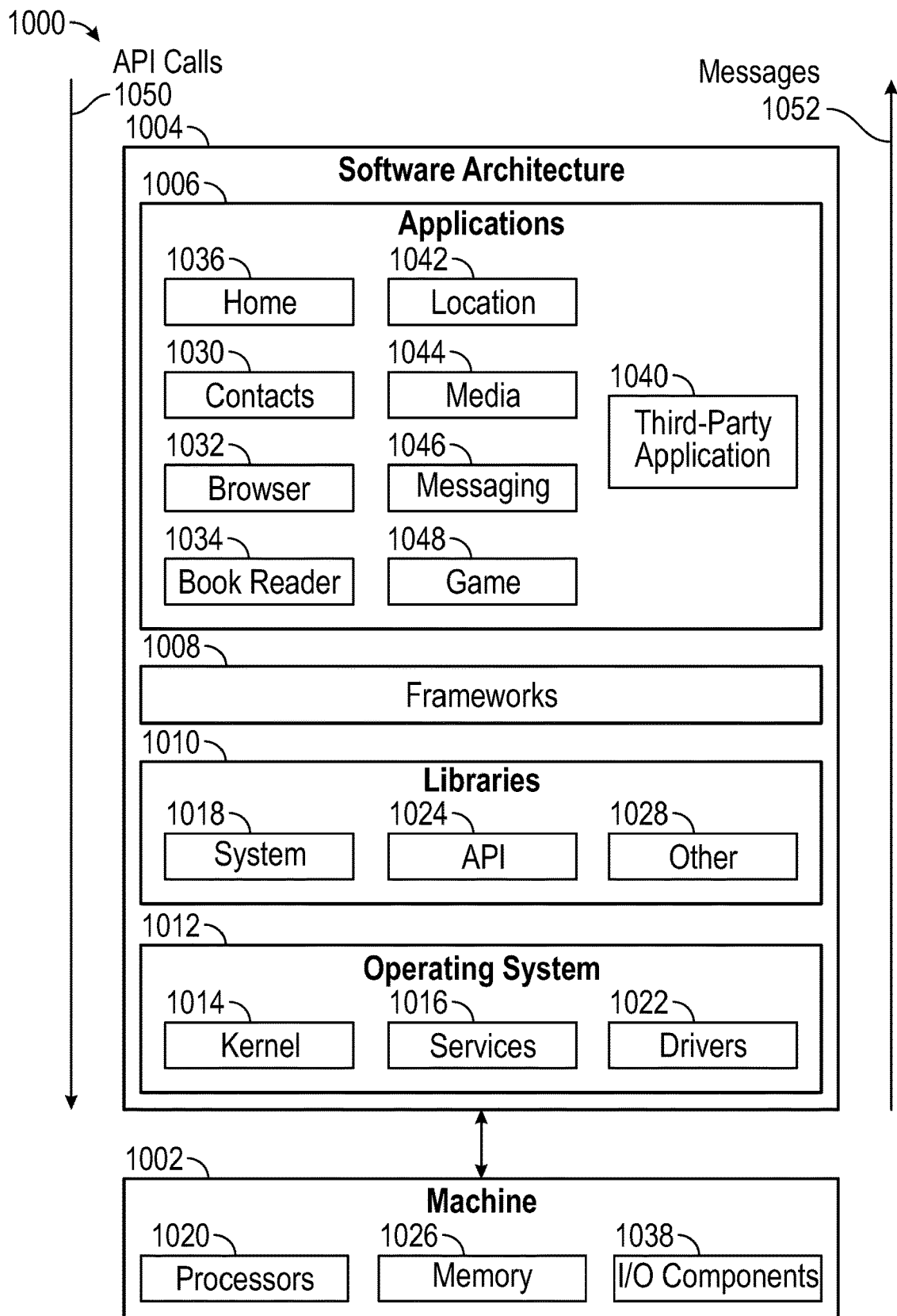
FIG. 10 is block diagram showing a software architecture within which the present disclosure may be implemented, in accordance with examples.

FIG. 10 is a block diagram 1000 illustrating a software architecture 1004, which can be installed on any one or more of the devices described herein. The software architecture 1004 is supported by hardware such as a machine 1002 that includes processors 1020, memory 1026, and I/O components 1038. In this example, the software architecture 1004 can be conceptualized as a stack of layers, where each layer provides a particular functionality. The software architecture 1004 includes layers such as an operating system 1012, libraries 1010, frameworks 1008, and applications 1006. Operationally, the applications 1006 invoke API calls 1050 through the software stack and receive messages 1052 in response to the API calls 1050.

The operating system 1012 manages hardware resources and provides common services. The operating system 1012 includes, for example, a kernel 1014, services 1016, and drivers 1022. The kernel 1014 acts as an abstraction layer between the hardware and the other software layers. For example, the kernel 1014 provides memory management, processor management (e.g., scheduling), component management, networking, and security settings, among other functionality. The services 1016 can provide other common services for the other software layers. The drivers 1022 are responsible for controlling or interfacing with the underlying hardware. For instance, the drivers 1022 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 1010 provide a low-level common infrastructure used by the applications 1006. The libraries 1010 can include system libraries 1018 (e.g., C standard library) that provide functions such as memory allocation functions, string manipulation functions, mathematic functions, and the like. In addition, the libraries 1010 can include API libraries 1024 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1010 can also include a wide variety of other libraries 1028 to provide many other APIs to the applications 1006.

The frameworks 1008 provide a high-level common infrastructure that is used by the applications 1006. For example, the frameworks 1008 provide various graphical user interface (GUI) functions, high-level resource management, and high-level location services. The frameworks 1008 can provide a broad spectrum of other APIs that can be used by the applications 1006, some of which may be specific to a particular operating system or platform.

In an example, the applications 1006 may include a home application 1036, a contacts application 1030, a browser application 1032, a book reader application 1034, a location application 1042, a media application 1044, a messaging application 1046, a game application 1048, and a broad assortment of other applications such as a third-party application 1040. The e applications 1006 are programs that execute functions defined in the programs. Various programming languages can be employed to create one or more of the applications 1006, structured in a variety of manners, such as object-oriented programming languages (e.g., Objective-C, Java, or C++) or procedural programming languages (e.g., C or assembly language). In a specific example, the third-party application 1040 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1040 can invoke the API calls 1050 provided by the operating system 1012 to facilitate functionality described herein.

What is claimed is:

1. A method comprising:
monitoring, by a server, a thermal state of a client device comprising a processor, wherein monitoring is for a predetermined period or initiated in response to a user-initiated interaction with the device;
determining, by the server, if the thermal state violates a thermal threshold, wherein the server receives the thermal threshold from the client device;
selecting a stored policy associated with the monitored thermal state if the thermal state violates the thermal threshold;
communicating, by the server, the selected stored policy to a client application on the client device for implementation by a processor of the client device, wherein the stored policy communicated to the client device is configured to adjust speculative tasks running on the client application,
wherein monitoring comprises detecting and logging over one or more predetermined sampling periods the load and frequency of at least one central processing unit (CPU) from each core of the at least one CPU of the client device, wherein the average CPU load and frequency from each core of the at least one CPU are combined to provide an operation index, wherein a maximum is identified for the operation index that reflects the thermal threshold, wherein the thermal threshold is violated if the operation index falls below the maximum; and
implementing, by the processor, the selected stored policy communicated by the server that is responsive to the violation of the thermal threshold received from the client device.

2. The method of claim 1, wherein the server comprises a thermal management system.

3. The method of claim 2, wherein the thermal management system includes a monitoring module and a policy enforcement module.

4. The method of claim 3, wherein the monitoring module monitors the thermal state associated with the client device.

5. The method of claim 4, wherein the monitoring module determines whether a throttle threshold of the client device has been violated.

6. The method of claim 4, wherein the monitoring module communicates with the policy enforcement module if the monitoring module detects thermal throttling of the client device.

7. The method of claim 6, wherein the policy enforcement module comprises two or more stored policies.

8. The method of claim 7, further comprising:
selecting, with the policy enforcement module, one of the two or more stored policies for implementation.

9. The method of claim 8, wherein the selecting is based on a current user of the client device.

10. The method of claim 8, wherein the selecting is based on a current mode of operation of the client device.

11. The method of claim 1, wherein the stored policy is configured to reduce the thermal state.

12. The method of claim 11, wherein the reduced thermal state does not violate the thermal threshold.

13. A system, comprising:
a memory that stores instructions; and
a processor configured by the instructions to perform operations comprising:
monitoring, by a server, a thermal state of a client device comprising a processor,
wherein monitoring is for a predetermined period or initiated in response to a user-initiated interaction with the device;
determining, by the server, if the thermal state violates a thermal threshold, wherein the server receives the thermal threshold from the client device;
selecting a stored policy associated with the monitored thermal state if the thermal state violates the thermal threshold; and
communicating, by the server, the selected stored policy to a client application on the client device for implementation by a processor of the client device, wherein the stored policy communicated to the client device is configured to adjust speculative tasks running on the client application,
wherein monitoring comprises detecting and logging over one or more predetermined sampling periods the load and frequency of at least one central processing unit (CPU) from each core of the at least one CPU of the client device, wherein the average CPU load and frequency from each core of the at least one CPU are combined to provide an operation index, wherein a maximum is identified for the operation index that reflects the thermal threshold, wherein the thermal threshold is violated if the operation index falls below the maximum; and
implementing, by the processor, the selected stored policy communicated by the server that is responsive to the violation of the thermal threshold received from the client device.

14. The system of claim 13, wherein the server comprises a thermal management system,
the thermal management system including a monitoring module and a policy enforcement module, and wherein the monitoring module monitors the thermal state associated with the client device and the server policy enforcement module comprises the stored policy.

15. The system of claim 14, wherein the monitoring module evaluates the thermal state from the client application running on the client device and detects thermal throttling of the client device, wherein the monitoring module determines whether a throttle threshold of the client device has been violated.

16. The system of claim 15, wherein the stored policy communicated to the client device is selected depending on a current user or a current mode of operation of the client device, or both.

17. A non-transitory processor-readable storage medium storing processor-executable instructions that, when executed by a processor of a server, cause the server to perform operations comprising:
monitoring, by the processor, a thermal state of a client device comprising a processor, wherein monitoring is for a predetermined period or initiated in response to a user-initiated interaction with the device;
determining, by the processor, if the thermal state violates a thermal threshold, wherein the server receives the thermal threshold from the client device;
selecting a stored policy associated with the monitored thermal state if the thermal state violates the thermal threshold; and
communicating, by the processor, the selected stored policy to a client application on the client device for implementation by a processor of the client device, wherein the stored policy communicated to the client device is configured to adjust speculative tasks running on the client application,
wherein monitoring comprises detecting and logging over one or more predetermined sampling periods the load and frequency of at least one central processing unit (CPU) from each core of the at least one CPU of the client device, wherein the average CPU load and frequency from each core of the at least one CPU are combined to provide an operation index, wherein a maximum is identified for the operation index that reflects the thermal threshold, wherein the thermal threshold is violated if the operation index falls below the maximum; and
implementing, by the processor, the selected stored policy communicated by the server that is responsive to the violation of the thermal threshold received from the client device.

18. The non-transitory processor-readable storage medium of claim 17, wherein the stored policy communicated to the client device adjusts speculative tasks running on the client device.

* * * * *